(12) United States Patent  (10) Patent No.: US 8,893,222 B2
Russello et al.  (45) Date of Patent: Nov. 18, 2014

(54) SECURITY SYSTEM AND METHOD FOR THE ANDROID OPERATING SYSTEM

(71) Applicant: Auckland Uniservices Ltd., Auckland (NZ)

(72) Inventors: Giovanni Russello, Auckland (NZ); Arturo Blas Jimenez, Auckland (NZ); Habib Naderi, Auckland (NZ); Wannes Van Der Mark, Auckland (AU)

(73) Assignee: Auckland Uniservices Ltd. (NZ)

( * ) Notice: Subject to any disclaimer, the term of this patent is extended or adjusted under 35 U.S.C. 154(b) by 0 days.

(21) Appl. No.: 14/046,725

(22) Filed: Oct. 4, 2013

(65) Prior Publication Data

US 2014/0137183 A1  May 15, 2014

(30) Foreign Application Priority Data

Nov. 13, 2012 (AU) .................................. 2012904941
Jul. 25, 2013 (AU) .................................. 2013902750

(51) Int. Cl.
*G06F 7/04* (2006.01)
*G06F 21/52* (2013.01)
*G06F 21/53* (2013.01)

(52) U.S. Cl.
CPC ................ *H04F 63/20* (2013.01); *G06F 21/52* (2013.01); *G06F 21/53* (2013.01)
USPC ................. 726/1; 726/27; 713/151; 713/152; 713/164

(58) Field of Classification Search
None
See application file for complete search history.

(56) References Cited

U.S. PATENT DOCUMENTS

| 8,326,958 | B1 * | 12/2012 | Raleigh | ......................... 709/223 |
| 2008/0250400 | A1 * | 10/2008 | Vertes | ........................... 717/158 |
| 2012/0101952 | A1 * | 4/2012 | Raleigh et al. | ................. 705/304 |
| 2013/0305322 | A1 * | 11/2013 | Raleigh et al. | ..................... 726/4 |
| 2014/0137184 | A1 | 5/2014 | Russello et al. | |

FOREIGN PATENT DOCUMENTS

| EP | 1693752 B1 | 4/2008 |
| GB | 2342472 A | 4/2000 |

OTHER PUBLICATIONS

Australian Application No. 2012904941, International-Type Search Report and Written Opinion mailed Mar. 27, 2013, 4 pgs.

* cited by examiner

*Primary Examiner* — Kaveh Abrishamkar
(74) *Attorney, Agent, or Firm* — Schwegman Lundberg & Woessner, P.A.

(57) ABSTRACT

A method of linking a security policy stored in a policy database that is specific to an application in the application layer with a new corresponding process launched in the LINUX layer in a security system for an operating system running on a device that comprises a LINUX-based kernel. The system architecture is defined by a middleware layer between the LINUX layer associated with the kernel and the higher application layer comprising the applications.

28 Claims, 6 Drawing Sheets

SECURITY SYSTEM AND METHOD FOR THE ANDROID OPERATING SYSTEM

CROSS-REFERENCE TO RELATED APPLICATIONS

The present application claims the benefit of priority under 35 U.S.C. §119 to Australian Patent Application No. 2012904941, filed Nov. 13, 2012 and claims the benefit of priority under 35 U.S.C. §119 to Australian Patent Application No. 2013902750, filed Jul. 25, 2013, both of which are incorporated herein by reference in their entirety.

FIELD OF THE INVENTION

The present invention relates to a security system and method for the ANDROID operating system. In particular, although not exclusively, the security system is suited for hardware devices and systems such as mobile phones, smartphones, tablet computers and other portable computing and communication devices that run on ANDROID operating system.

BACKGROUND TO THE INVENTION

The ANDROID operating system is a LINUX-based operating system designed primarily for touchscreen mobile devices such as smartphones and tablet computers. The ANDROID operating system uses a LINUX kernel at its core, and also provides an application framework that software developers incorporate into their ANDROID operating system applications and services. The ANDROID operating system additionally provides a middleware layer between the LINUX operating system at the LINUX operating system layer and the ANDROID operating system applications and services at the higher the application layer to enable easier cross-platform development for deploying the same applications or services across different types of smartphones, tablets or other hardware.

The middleware layer comprises libraries that provide services such as data storage, screen display, multimedia, and web browsing, and are compiled to machine language to enable services to execute quickly. The middleware libraries implement device-specific functions, so applications and the application framework need not concern themselves with the variations between devices running the ANDROID operating system. The middleware layer also supports a specialized version of Java to simplify cross-platform development. In particular, it contains the Dalvik Virtual Machine (DVM) and its core Java application libraries. Applications or services can be compiled from Java (or other supported languages) to a byte-code that can be run by the DVM.

Although the middleware layer simplifies application development, it also adds significantly more complexity to the overall ANDROID operating system. This additional complexity can be exploited by applications or services programmed to perform malicious tasks (malware) or execute malicious code (malcode).

By way of example, malware or malcode can exploit Inter-Process Communications (IPC) to attack sensitive applications and their data. Referring to FIG. 1, each application 10,12 is executed in a respective DVM 14,16. When launched, each application corresponds to an instance of a DVM. Each DVM 14,16 is mapped into a dedicated process 18,20 running in User Mode 22 in the LINUX operating system layer 24. In the ANDROID operating system, applications can communicate with each other using IPC mechanisms. The standard mechanism in the ANDROID operating system to implement IPC is though the Binder framework. The Binder framework has the facility to provide bindings to functions and data from one process to another. The Binder framework in the ANDROID operating system is provided in three levels. At the application layer 42 there is an Application Programming Interface (API) 26,28 to enable applications to communicate with each other, such as the ANDROID Interface Definition Language (AIDL). The AIDL allows application developers to define the interface for remote service and an AIDL parser generates the required Java client and server code. At the middleware layer 44 a Binder 30, such as C++ code, is provided which has user space facilities to be used by the applications via Java Native Interface (JNI) and interacts with the Binder kernel driver 32 in the LINUX operating system layer 24. The Binder kernel driver 32 in the LINUX kernel carries out the message passing between processes and provides a shared memory facility. The driver sits behind a special device, /dev/binder, and implements various system calls, such as open and ioctl, to enable processes to communicate with each other.

As shown in FIG. 1, the IPC mechanism can be described in two layers. At the ANDROID operating system layer 46, when Application 1 (10) sends an IPC through its AIDL API (26) as shown at 34, the binder code 30 in the middleware will take care of the delivery of the request to the destination Application 2 (12) as shown at (36). At the LINUX operating system layer, this operation is translated into a sequence of system calls (open and ioctl) executed by Process 1 (18) (corresponding to Application 1) using the binder kernel driver (dev/binder) 32 as shown at (38). The request is then forwarded to Process 2 (20) (corresponding to Application 2) as shown at (40).

In conventional UNIX and LINUX operating systems, security systems have been proposed that use kernel modules in order to trace a process to enforce security policies, and this involves recompiling the kernel image in order to register the module. Additionally, as new applications are launched by the user via a shell, the monitoring module is able to link the correct security policy to the newly launched process. Such security systems do not work effectively on the ANDROID operating system, which uses a distinctly different way of launching and managing programs. It is also desirable to have a security system for the ANDROID operating system that does not require recompilation of the LINUX kernel.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

It is an object of the invention to provide a security system and method for the ANDROID operating system in which security policies for each application can be configured at the ANDROID operating system layer and which are enforced at the lower LINUX operating system layer, or to at least provide the public with a useful choice.

SUMMARY OF THE INVENTION

In a first aspect, the invention broadly consists in a method for securing an operating system running on a device comprising a LINUX-based kernel and a system architecture defined by a middleware layer between the LINUX operating system layer associated with the kernel and the higher application layer comprising applications, the method comprising:

monitoring system calls to the kernel mode by a mother process in the LINUX operating system layer to detect the launching of a new process in the LINUX operating system layer corresponding to a new application or part of an application in the application layer; and attaching a new monitor process in the LINUX operating system layer to the newly launched process once it is created by the mother process, the monitor process being configured to monitor system calls made to the kernel by the new process and to retrieve and enforce security policies configured for the new process based on the parameters of detected system calls.

By way of example, the new application or part of an application, may be launched by the user of the device, the operating system itself, or an already running application or process. The launch of a new application or part of an application in the application layer corresponds to the starting, launching or forking of a process in the LINUX operating system layer.

Preferably, the method further comprises providing security policies for the applications in the application layer in a policy database. More preferably, the policy database is stored on the device or is stored remotely but is accessible to the device.

Preferably, the method further comprises defining and storing security policies for the applications in the application layer in a policy database.

Preferably, the operating system is the ANDROID operating system. More preferably, the mother process is the Zygote process.

Preferably, attaching a monitor process to the new process in the LINUX operating system layer comprises configuring the monitor process as a master process and the associated new process as its target process. More preferably, attaching the monitor process to the new process comprises requesting the kernel to execute a tracing system call that is configured to intercept all or at least a set of system calls executed by the target process and report those to the master process prior to execution of the system call. By way of example, the tracing system call may be a process trace system call (ptrace). Preferably, the kernel is configured to report to the master process system calls made by the target process both prior to and after the execution of the system call.

Preferably, the monitor process is configured to access and retrieve the security policy for its attached new process from a security system service at the application layer which has access to the configurable security policies for the applications of the application layer in the policy database. More preferably, the monitor process at the LINUX operating system layer is configured to establish a communication link with the security system service at the application layer. By way of example, the communication link may be a direct link such as a transmission control protocol (TCP) link or connection or similar.

Preferably, the method further comprises loading the new process monitor with the relevant security policies for its attached target process by:

monitoring the specialization process of the target process as it specializes as the intended application;

extracting application identification data from the specialization process that is indicative of the application the target process is specializing as;

retrieving the relevant security policies for the target process based on the extracted application identification data.

By way of example, the application identification data may be the application package name. In one form, the method comprises extracting the application identification data from a system call in the specialization process. In another form, the method comprises extracting the application identification data from a specialization data file that the full application package name of the target process is written to during the specialization process.

Preferably, retrieving the relevant security policies for the target process based on the extracted application identification data comprises sending a request for the security policies to a security system service in the application layer, the request comprising the application identification data.

Preferably, the monitor process is configured to enforce the retrieved security policy for its attached new process by implementing a security action at the LINUX operating system layer in regard to the detected system call based on the retrieved security policy. The security action may comprise any one or more of the following: allowing the system call to proceed, blocking the system call from proceeding, modifying parameters of the system call prior to execution or return values generated by the system call after execution, or prompting the user of the device to select a security action. By way of example, the monitor process may implement a security action by instructing and controlling the kernel in regard to its execution of the requested system call by the attached monitored process.

Preferably, each process monitor is configured to enforce security policies based on parameters extracted from the detected system calls. For explicit system calls, the security policies may be evaluated and enforced based directly on extracted system call parameters. For implicit system calls, the process monitors may be configured to retrieve further information about the system call from the security system service in the application layer before evaluating and enforcing the security policies.

Preferably, the method further comprises initially stalling execution of the new process until the monitor process has been attached to the new process. More preferably, stalling execution of the new process comprises creating a breakpoint in the new process to prevent it from executing and subsequently removing the breakpoint to allow the new process to specialise as the new application and execute once the monitor process has been established and attached to the new process. By way of example, the breakpoint may be an endless loop.

Preferably, monitoring system calls to the kernel made by a mother process comprises establishing a main monitor process before the mother process initiates and attaching the main monitor process to the mother process by configuring the main monitor process as a master process and the mother process as its target process. More preferably, attaching the main monitor process to the mother process comprises requesting the kernel to execute a tracing system call that is configured to intercept all or at least a set of system calls executed by the mother process and report those to the main monitor process prior to execution of the system call.

Preferably, the method further comprises attaching a new individual monitor process to each newly launched process created by the mother process each individual monitor process being configured to enforce the security policy corresponding to the application for its attached monitor process.

In a second aspect, the invention broadly consists in a security system for an operating system running on a device that comprises a LINUX-based kernel, and a system architecture defined by a middleware layer between the LINUX operating system layer associated with the kernel and the higher application layer comprising applications, the system comprising:

a main monitor process running at the LINUX operating system layer which is configured to detect the launch of a new process in the LINUX operating system layer by a mother process, the new process corresponding to the launching of a new application or part of an application in the application layer by the user of the device;

a process monitor attached by the main monitor to each new process created by the mother process and each process monitor being configured to monitor the system calls made by its attached process to the kernel; and a security system service running at the application layer that is operable to access stored configurable security policies for the applications of the application layer, and which communicates with each process monitor in the LINUX operating system layer the security policies corresponding to its attached process, and wherein each process monitor is configured to retrieve and enforce the security policy configured for its attached process based on the parameters of the detected system calls.

Preferably, the security system further comprises an accessible policy database comprising stored configurable security policies for the applications in the application layer. The policy database may be stored on the device or remotely stored and accessible to the device.

Preferably, the operating system is the ANDROID operating system. More preferably, the mother process is the Zygote process.

Preferably, the main monitor process is attached to the mother process. More preferably, the attachment is created by a process trace system call, with the main monitor configured as the master process and the mother process being configured as the target process.

Preferably, each process monitor is attached to its respective process by a process trace system call, with the process monitor being the master process and its respective attached process being the target process.

Preferably, each process monitor is configured to load the security policies for its attached target process by retrieving the security policies from the security system service. More preferably, each process monitor is configured to monitor the specialization process of its target process to extract application identification data indicative of the application the target process is specializing as, and to retrieve the relevant security policies for the target process from the security system service based on the extracted application identification data.

Preferably, the process monitor(s) communicate with the security system service over a communication link or mechanism between the LINUX operating system layer and application layer. By way of example, the communication mechanism may be client-server transactions over a TCP link or similar.

The second aspect of the invention may have any one or more features mentioned in respect of the first aspect of the invention above.

In a third aspect, the present invention broadly consists in a method of configuring a process monitor attached to a new target process in a security system for an operating system running on a device that comprises a LINUX-based kernel, and a system architecture defined by a middleware layer between the LINUX operating system layer associated with the kernel and the higher application layer comprising applications, the method comprising:

monitoring the specialization process of the target process as it specializes as its intended application;

extracting application identification data from the specialization process that is indicative of the application or type of application the target process is specializing as;

retrieving security policies specific to the target process from a policy database based on the extracted application identification data; and configuring the process monitor to enforce the retrieved security policies.

In a fourth aspect, the present invention broadly consists in a method of linking a security policy stored in a policy database and which is specific to an application in the application layer with a new corresponding process launched in the LINUX operating system layer in a security system for an operating system running on a device that comprises a LINUX-based kernel, and a system architecture defined by a middleware layer between the LINUX operating system layer associated with the kernel and the higher application layer comprising the applications, the method comprising:

monitoring the specialization process in the LINUX operating system layer of the new process as it specializes as its intended application;

extracting application identification data from the specialization process that is indicative of the application or type of application the target process is specializing as; and creating a link between the new process and a security policy from the policy database based on the application identification data.

In one form, creating a link comprises retrieving the security policy from the policy database and loading it into a process monitor attached to the new process for enforcing them.

In a fifth aspect, the present invention broadly consists in a method of implementing security policies at the LINUX operating system layer, the policies being defined for applications or types of applications in the application layer, wherein the method comprises monitoring the loading and/or identification of code used to specialize a new LINUX operating system process to implement its corresponding intended application, and linking a security policy for implementing at the LINUX operating system layer to the new LINUX operating system process based on the loaded or identified code.

By way of example, the security policies may be defined for each application or a type of application.

Preferably, linking a security policy to the new LINUX operating system process comprises identifying a security policy for new LINUX operating system process from the code used to specialize the new LINUX operating system process.

Preferably, the application layer is the ANDROID operating system layer.

The third-fifth aspects of the invention may comprise any one or more features mentioned in respect of the first and second aspects of the invention.

The phrase "specialization process" or term "specializing" as used in this specification and claims is intended to mean, unless the context suggests otherwise, the process by which a newly created process in the LINUX operating system layer identifies the corresponding application in the application layer to which it relates and then retrieves and loads the application-specific code for that application for execution.

The term "attached" or "attaching" as used in this specification and claims is intended to mean, unless the context suggests otherwise, creating a relationship between two processes in the LINUX operating system layer whereby one process is configured to monitor and control the other process in parent-child or master-target relationship, and by way of example includes attachment by way of a process trace system call, e.g. ptrace, or any other mechanism that creates a link or attachment between processes which enables one process to control one or more aspects or functions of the other process.

The term "LINUX" as used in this specification and claims is intended to mean, unless the context suggests otherwise, any LINUX operating system employing a LINUX, or UNIX, or UNIX-like kernel.

The phrase "LINUX operating system layer" as used in this specification and claims is intended to mean, unless the context suggests otherwise, the layer in the operating system architecture for describing the operation of processes in User Mode and their interaction with the kernel in Kernel Mode.

The phrase "middleware layer" as used in this specification and claims is intended to mean, unless the context suggests otherwise, the layer in the operating system architecture for describing the software operating between the LINUX operating system layer and the application software in the application layer.

The phrase "application layer" as used in this specification and claims is intended to mean, unless the context suggests otherwise, the layer in the operating system architecture for describing the operation of user application software and services.

The phrase "mother process" as used in this specification and claims is intended to mean, unless the context suggests otherwise, typically the process running after boot-up of the operating system that controls the launch or initiation of all new children processes at the LINUX operating system layer via interaction with the kernel, and for example in the context of the ANDROID operating system is equivalent to the Zygote process which initiates new processes by forking a new replica or image of itself, and may also be referred to as a "parent process".

The term "monitoring" as used in this specification and claims is intended to mean, in the context of master-target process or parent-child process relationship, where the master or parent intercepts, controls, modifies and/or traces system calls made by the target or child process to the kernel, and may also include or be referred to technically as "interposing" and/or "interleaving".

The term "comprising" as used in this specification and claims means "consisting at least in part of". When interpreting each statement in this specification and claims that includes the term "comprising", features other than that or those prefaced by the term may also be present. Related terms such as "comprise" and "comprises" are to be interpreted in the same manner.

As used herein the term "and/or" means "and" or "or", or both.

As used herein "(s)" following a noun means the plural and/or singular forms of the noun.

The invention consists in the foregoing and also envisages constructions of which the following gives examples only.

In the following description, specific details are given to provide a thorough understanding of the embodiments. However, it will be understood by one of ordinary skill in the art that the embodiments may be practiced without these specific details. For example, software modules, functions, circuits, etc., may be shown in block diagrams in order not to obscure the embodiments in unnecessary detail. In other instances, well-known modules, structures and techniques may not be shown in detail in order not to obscure the embodiments.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc., in a computer program. When a process corresponds to a function, its termination corresponds to a return of the function to the calling function or a main function.

Aspects of the systems and methods described below may be operable on any type of device running the ANDROID operating system, including, but not limited to, a desktop, laptop, notebook, tablet or mobile device. The term "mobile device" includes, but is not limited to, a wireless device, a mobile phone, a smartphone, a mobile communication device, a user communication device, personal digital assistant, mobile hand-held computer, a laptop computer, an electronic book reader and reading devices capable of reading electronic contents and/or other types of mobile devices typically carried by individuals and/or having some form of communication capabilities (e.g., wireless, infrared, short-range radio, etc.).

BRIEF DESCRIPTION OF THE DRAWINGS

Preferred embodiments of the invention will be described by way of example only and with reference to the drawings, in which.

DETAILED DESCRIPTION OF PREFERRED EMBODIMENTS

Overview

Figure 1:
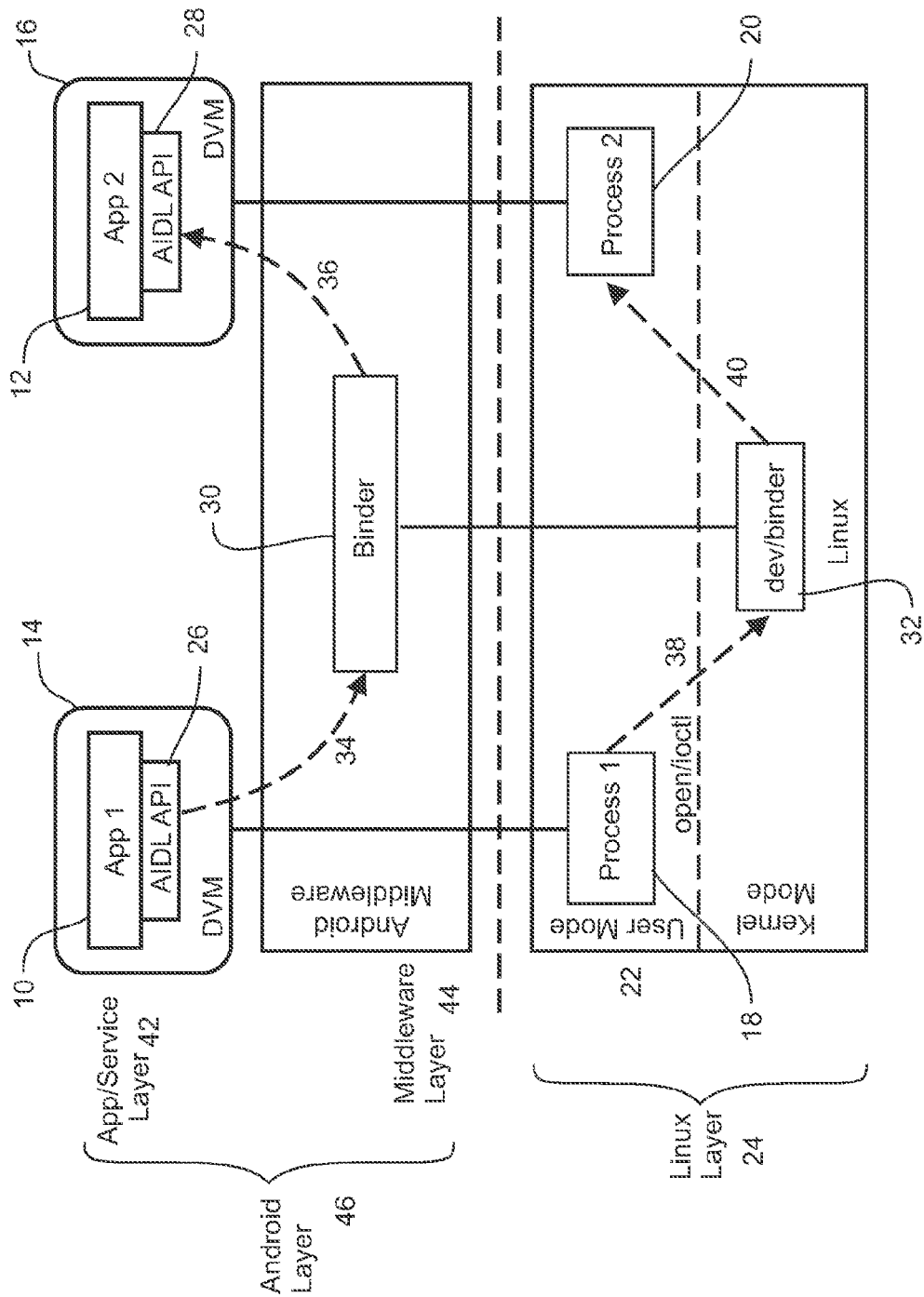
FIG. 1 is a schematic diagram of an ANDROID operating system and showing an example of the IPC mechanism.

In conventional UNIX and LINUX operating systems, security systems have been proposed to mitigate malware IPC attacks between application programs by intercepting system calls to the kernel. System calls are a key instruction that need to be monitored because they can be used to access sensitive parts of the operation system that are controlled by the kernel, for example the file system, shared memory, network connections and the like. For setting security policies it is necessary to know which application has requested a specific system call. An application may consist of one or multiple process. In turn, each process may run one or multiple threads concurrently to execute instructions, some of which may be system calls that interact with the kernel. In conventional UNIX and LINUX operating systems the names of the processes and the application they belong to are known to the kernel as the applications are launched by the user via a shell. The security system monitors all system calls and based on the relevant policy specified for an application they are either allowed or blocked. This prevents malicious applications from executing illegal system calls, while allowing normal applications to carry out their functions. Such security systems do not work on the ANDROID operating system, which uses a distinctly different way of launching and managing programs. In particular, the kernel in the ANDROID operating system in the LINUX operating system layer is not aware of which processes in the user mode correspond to which applications in the ANDROID operating system layer until a very late stage and therefore which applications may be attempting to communicate with each other via system calls is very difficult to ascertain.

This invention relates to a security system for the ANDROID operating system or other computer architectures having similar structures or configuration. The security system utilizes an approach that allows monitoring user space code without the need to modify the ANDROID operating system framework or the underlying LINUX kernel. In particular, the security system is configured to control inter-process communications (IPC) between applications to mitigate attacks that malware might perform on sensitive applications and their data. In principle, this invention is able to control and enforce security policies to any process running on an ANDROID operating system. This includes system services that are offered in the stock ANDROID operating system (such as SMS service, Activity Manager, Service Manager, etc.). In this way, this invention is able to mitigate vulnerabilities present in the ANDROID operating system services that might be exploited by malicious code.

The security system is implemented based on a feature unique to the ANDROID operating system, namely the mother process called Zygote. Every ANDROID operating system application is run as a child forked out from the Zygote process and then it specializes itself by loading the specific application package and all the classes within it, and making use of Java reflection it will eventually start the application by invoking the static main method. The security system runs a system process that attaches to the Zygote process and intercepts all its fork system call invocations, so that whenever a fork system call is intercepted, the security system starts monitoring the new process and enforcing the specific security policies for that specific ANDROID operating system application. The security system is able to enforce a set of security policies on devices running the ANDROID operating system, which can be provided either by the security system itself, a systems administrator, the device user, a third party service or system, the ANDROID operating system application, or a combination of these.

The security system enables the specification or configuration of application-specific security policies at the application layer, that can be enforced in the LINUX operating system layer. The security system will be described by way of example with specific reference to an ANDROID operating system on a device running the ANDROID operating system. However, it will be appreciated that the security system may be configured to operate on any other suitable operating system having a similar architecture to the ANDROID operating system which uses a mother process to launch new processes in the LINUX operating system layer.

Main Components of Security System

Figure 2:
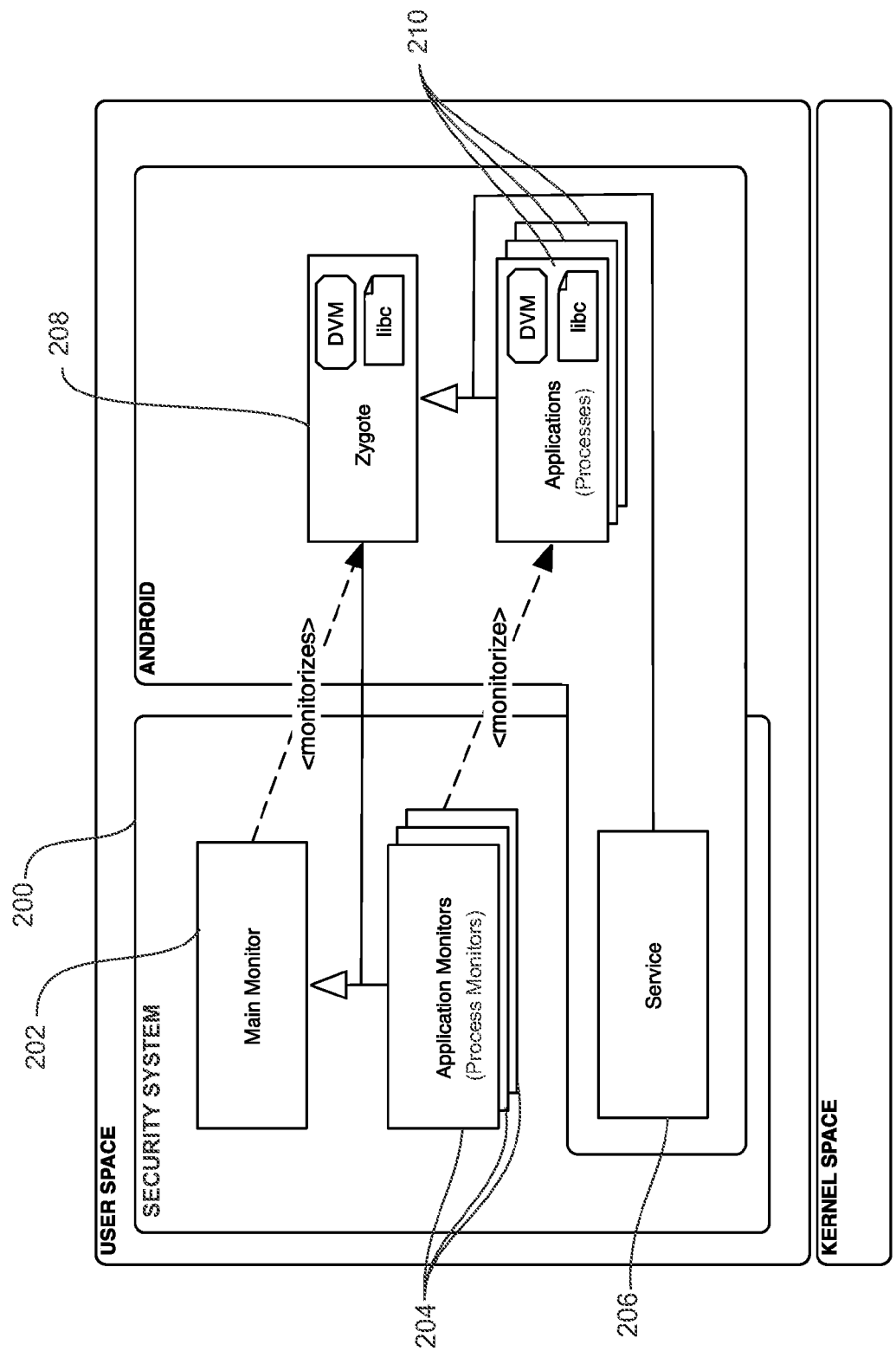
FIG. 2 is a schematic diagram of the framework basic architecture for the security system in accordance with an embodiment of the invention.

Referring to FIG. 2, an embodiment of the security system 200 comprises three main components or modules, namely a main monitor 202, application or process monitors 204, and a security system service 206.

The monitors 202, 204 are in charge of enforcing a set of security policies for one or more processes and are implemented in the LINUX operating system layer. The monitors contain the policy enforcement point as well as the policy decision point, which will be described later. In this embodiment, there is a single main monitor 202 that is configured to monitor the Zygote system process 208. The rest of the process monitors 204 are forked out of this main monitor process. There may be zero or more application monitors 204, one for each ANDROID operating system application 210 that is forked out of the Zygote process. Process monitors 204 are created as children of the main monitor 202 when a fork system call from the Zygote process is intercepted. In contrast to the main monitor 202 that is configured to monitor the main Zygote thread, the individual process monitors 204 are configured to monitor all application threads and sub-processes to which they are attached.

The security system service 206 is configured as an ANDROID operating system service in the Application layer that provides access to all the ANDROID operating system framework functionality in the ANDROID operating system layer to the monitors 202, 204, which are not able to use such functions from the LINUX operating system layer. In this embodiment, the monitors 202,204 in the LINUX operating system layer communicate with the security system service 206 in the Application layer using a client-server communication configuration such as, but not limited to, TCP sockets.

Example Configuration and Operation

Figure 3:
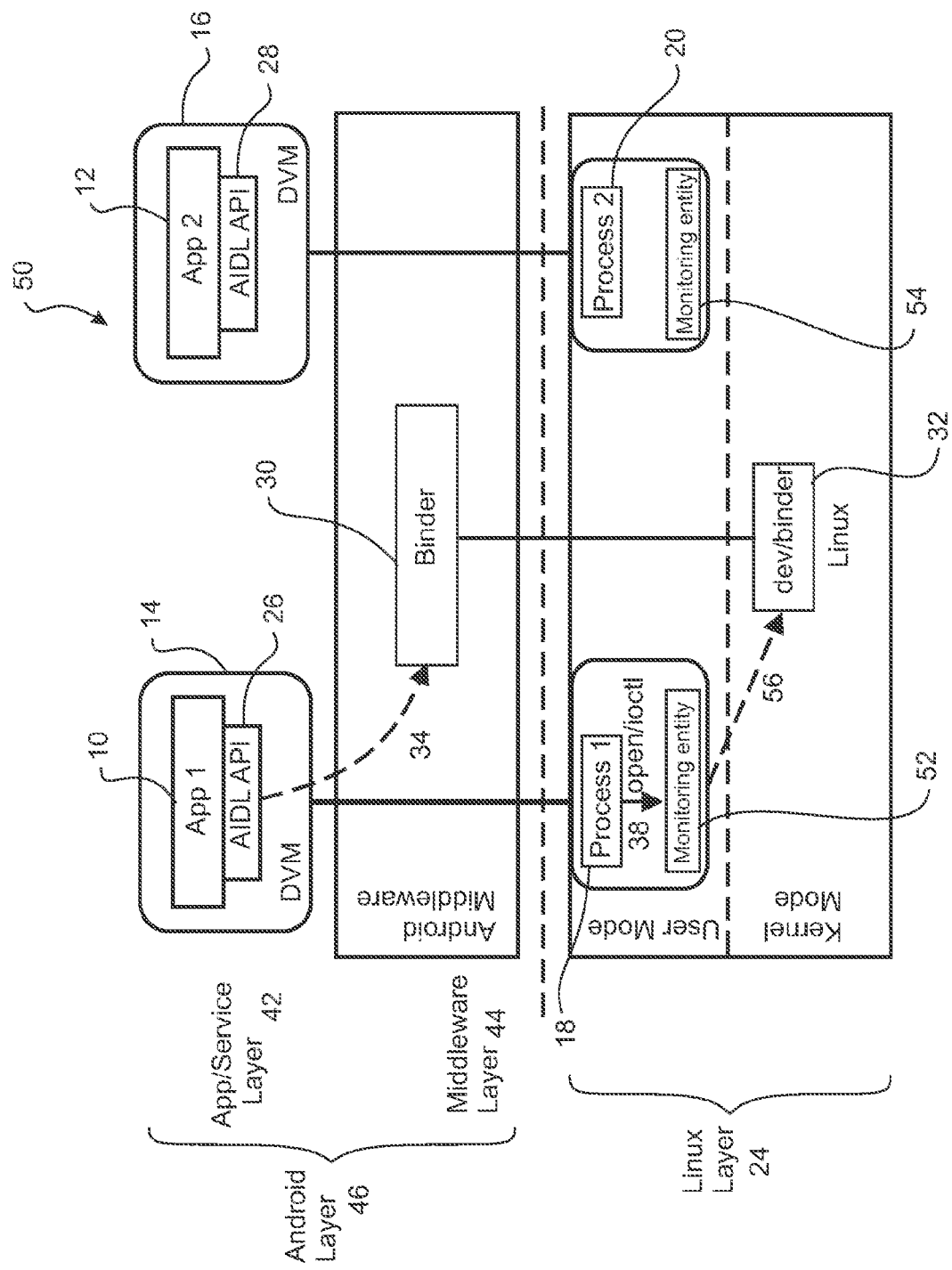
FIG. 3 is a schematic diagram showing the ANDROID operating system of FIG. 1 implementing a security system in accordance with an embodiment of the invention.

Further explanation of the security system configuration and functionality of the main modules will now be described with reference to the example in FIGS. 3-5. FIG. 3 corresponds to the architecture described in FIG. 1 and like numerals represent like components. In brief, each LINUX operating system process 18,20, in the LINUX operating system layer that belongs to an ANDROID operating system application 10,12 has its own attached process monitor shown at 52,54 respectively. Each process monitor 52,54 is configured to intercept all or a subset of the system calls that the attached LINUX operating system process 18,20 executes on behalf of its associated application 10,12. When each LINUX operating system process executes a system call, the attached process monitor intercepts the system call and undertakes a security action based on a security policy associated with the application which indicates whether the LINUX operating system process has authorisation to execute that system call. By way of example, the process monitor may be configured to allow the system call, block the system call, modify the parameters of the system call, modify the values returned by the system call or other suitable security action, or a combination of these. If the LINUX operating system process is authorised to make the system call, the process monitor lets the execution of the system call proceed. Alternatively, the process monitor may block the system call from executing or otherwise modify the system call parameters or return values. For example, the process monitor is able to retrieve the parameters of the system call and additionally the values that the system call returns. This enables the process monitor to modify the system call, for example by filtering out one or more return values or changing or modifying one or more parameters of the system call prior to execution depending on the configured security policy for the application. By way of example, the process monitor may be configured to modify the system call rather than blocking the system call for application that may crash as a result of a blocked system call.

By way of example, the process monitor 52 is configured to intercept IPC system calls 34 through the binder 30 by intercepting the open and ioctl system calls 38 made to the binder kernel driver 32 in the LINUX kernel. The process monitor 52 then decides based on the security policy configured for the associated application 10 in the application layer whether to block the system call or otherwise allow the system call to proceed in its original or a modified state as shown at 56.

Each process monitor is configured and attached to a new LINUX operating system process by a main monitor which is a LINUX operating system process created at boot-up of the device before the initiation of any other processes and which will be explained in further detail later. The security policy dictating the authorisations of applications installed on the device in the application layer and in particular which application may communicate with each other or employ each other's services or permissions or other sensitive stored data is configurable and stored and/or retrieved by a security system server in the application layer which will be described in further detail later. The security policies may be stored in memory locally on the device or remotely on an external database, server or network accessible by the device.

Each process monitor is attached to its corresponding LINUX operating system process by establishing the monitor process as the master process and associated LINUX operating system process as its target process and using a tracing system call that is configured to enable a master process to control a target process by inspecting its memory and intercepting its system call. In this embodiment, the tracing system call is the process trace system call (ptrace). To use ptrace, the master process has to be either running as the route user or the parent process of the target process. The master process will be able to monitor and control all the child processes that are forked by its target process by intercepting the forked system call.

As mentioned, the security system is configured to monitor all applications and corresponding processes executed on the device running the ANDROID operating system by exploiting a configuration feature of the ANDROID operating system which controls the management and launching of applications. In the ANDROID operating system, all applications in the application layer and corresponding LINUX operating system processes are launched by a special mother process, known as the Zygote process. The Zygote process is the only process that has the right to fork a new ANDROID operating system application and corresponding LINUX operating system process. All ANDROID operating system applications and corresponding LINUX operating system processes executing can be considered children of this Zygote process. The configuration of the security system and operation of the main modules will now be described in further detail.

Security System Start-up

The security system starts as a part of the ANDROID operating system. As mentioned, the security system controls the mother or Zygote process so that every time a new LINUX operating system process (corresponding to an ANDROID operating system application) is started, a new monitor can be attached to the process. Controlling the Zygote processes achieved by modifying the booting sequence of the ANDROID operating system.

By way of example, the booting sequence is modified such that the main monitor of the security system replaces the initial Zygote process. During the boot process the initialization script is run and the main monitor is started. The Zygote process is then launched as a child of the main monitor. The main monitor then executes a tracing system call, such as ptrace, to attach to the child Zygote process to control its execution from the first moment it begins, by intercepting system calls to the kernel made by the Zygote process. At this point in boot-up, the main monitor is now attached to and monitoring the Zygote process.

In this embodiment, the security system service is also started by the ANDROID operating system during the boot process. By way of example, the security system service is located within the directory for system applications such that it launches before a user can log-in or any user application can be run on the device running the ANDROID operating system. Once the security system service is running, every time a new ANDROID operating system application is forked from Zygote, a new process monitor is forked from the main monitor and attached to the new application process, as explained in further detail next.

Generation of Process Monitors for Newly Launched ANDROID Operating System Applications Overview The sequence of main operations executed by the security system to generate and configure a process monitor for a newly launched ANDROID operating system application will be described. When the security system starts, only the main monitor process is running, along with the security system service. The main monitor is attached to and monitoring the Zygote process. New process monitors are created as children of the main monitor. In order to do this, the main monitor is configured to intercept the Zygote process invocations of the fork system call, which is called every time a new application is launched in the the ANDROID operating system.

Figure 4:
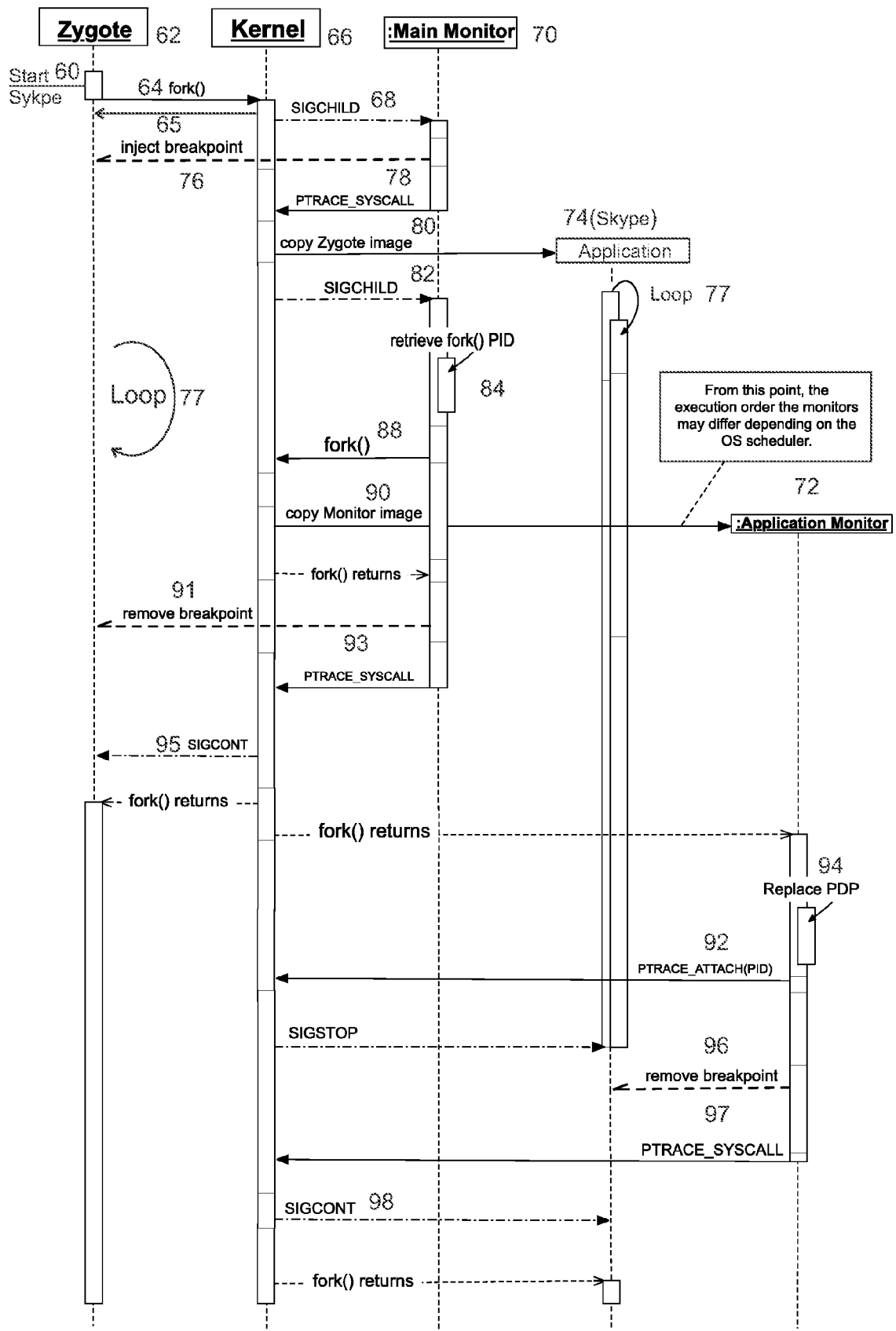
FIG. 4 is a flow diagram of the system of operation carried out by the security system when creating a new process monitor for a newly launched application on a device running the ANDROID operating system.
Figure 5:
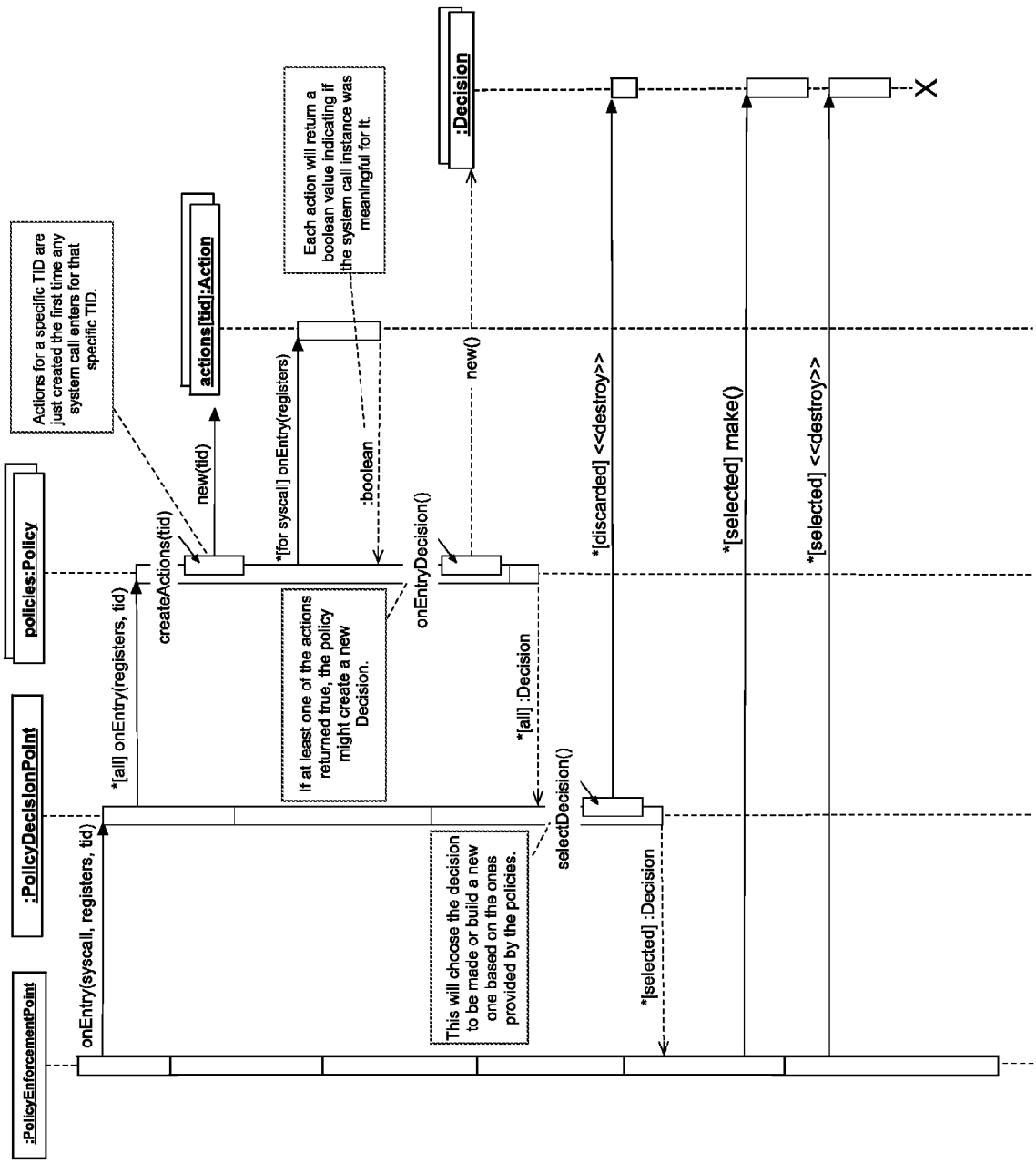
FIG. 5 shows a flow diagram of the decision generation process in accordance with an embodiment of the security system.

Referring to FIG. 4, the scenario of a user launching the SKYPE application on their ANDROID operating system smartphone will be used by way of example. When the user clicks on the SKYPE icon on their smartphone a message or signal 60 is sent to the Zygote process 62 to fork a new process 74 that executes in a new DVM for the SKYPE application.

Every time Zygote 62 implements a fork system call 64 to the kernel 66, it will be stopped with signal 65 by the kernel 66 and the main monitor 70 will be notified by the kernel with signal 68 (e.g. SIGCHILD) and woken up. The kernel dispatches these signals because the main monitor 70 is monitoring Zygote 62 through the ptrace system call. A new process monitor 72 must now be created as fork system call of the main monitor 70 and attached to the newly created process 74.

Due to the scheduling performed by the ANDROID operating system scheduler, there's no way to guarantee that the process execution order will allow the new process monitor 72 to attach to the new LINUX operating system process 74 corresponding to the SKYPE application before it executes any system calls. In some circumstances, the new process 74 could start executing its code without the process monitor 72 be able to control it, which could lead to security issues.

In order to avoid this situation, the main monitor is configured to inject a breakpoint 76 (e.g. an endless loop 77) into the Zygote process code, so that when its image is duplicated to create the new process 74 it will contain that breakpoint as well. The new process 74, now containing the loop 77, is initially stuck inside the loop and it is not able to execute any other code until the breakpoint is removed. By way of example, the breakpoint may be an infinite loop in ARM assembly code or any other equivalent method of stalling program execution. An example of the breakpoint injection for this embodiment and the remaining process monitor 72 generation will be further described below.

Breakpoint Injection

As set out above, every time a new ANDROID operating system application 74 forks from Zygote 62, the security system injects a breakpoint 76 into Zygote 62 so that when its image is duplicated, the new process 74 will contain the breakpoint as well and the new process monitor 72 can attach to it before it continues its execution without missing any system calls.

As mentioned, the "breakpoint" 76 may be, for example, an infinite loop in ARM assembly code. The breakpoint is injected 76 at the current program counter address (PC) within the Zygote process memory as follows using the following procedure. Firstly, in order to resume the Zygote program execution, the state of Zygote registers should be backed-up in the memory of the main monitor 70, as well as the Zygote program code that will be replaced by the breakpoint itself. By way of example, the main monitor 70 may copy the Zygote program code into its memory using ptrace (PTRACE_PEEKDATA) which allows to read data from the monitored process memory, in this case Zygote. The main monitor may read and store the state of the Zygote process registers in its own memory using ptrace(PTRACE_GETREGS). After this, the main monitor 70 is configured to reset the PC to its previous address (that will later contain the breakpoint) so that it continues its execution at the breakpoint code injected. The register R1 of Zygote 62 is set to zero, which enables the breakpoint. Next, the main monitor is configured to inject the breakpoint code into Zygote. The main monitor 70 contains a function that compiles ARM assembly code that executes an infinite loop (based on the value of R1), and this is the code that is injected into the Zygote process memory. The breakpoint function machine code is obtained from the function address in the main monitor memory as an array of bytes. Then the breakpoint code is copied from the main monitor memory into the Zygote memory at the program counter address using ptrace(PTRACE_POKEDATA) which allows the tracer to insert data into the monitored process memory space.

New Process Creation, after Breakpoint Injection

Once the breakpoint code has been inserted into Zygote as above, the main monitor 70 is configured to send a signal 78 to the kernel to allow the kernel space code of the Zygote fork system call to execute. As the fork system call executes 80, a new process 74 (intended to eventually be SKYPE in this example) is created. The new process 74 is a clone of Zygote 62 or a duplicate of the Zygote process image in memory, including the injected breakpoint. The newly created process 74 may then run, but will be stalled in the breakpoint loop 77. The main monitor 70 is then configured to wait until it receives the fork system call exit notification. In particular, the main monitor 70 is configured to monitor for the exit notification and intercept it.

New Process Monitor Creation

When the fork system call returns in Zygote (the system call is exiting), the process will be stopped by the kernel 66 and the kernel will notify the main monitor 70 via signal 82 (e.g. SIGCHILD). At this point, the Process Identification (PID) of the new process 74 is already available. Each process has a unique PID that allows the kernel to identify the different processes running. The main monitor 70 is configured to retrieve the PID of the new process 74 as shown at 84 from Zygote. For example, the main monitor 70 may retrieve the PID from the Zygote process register R0 using ptrace(PTRACE_GETREGS). The main monitor 70 is then configured to generate a new process monitor 72 attached to that retrieved PID.

The main monitor 70 forks the new process monitor 72 by executing a fork system call 88 to the kernel 66. When the main monitor process forks 90 a new process, the newly created process monitor 72 is at the beginning of its execution an exact replica of the parent main monitor process. This means that when the main monitor 70 forks the new process monitor 72, the process monitor has in its memory structure the PID of the new process 74 (intend to eventually be SKYPE) created by Zygote 62.

The main monitor 70 is then configured to replace the breakpoint code in Zygote 62 with the original code backup at the original location using ptrace(PTRACE_POKEDATA) and resets the registers to their original stored values using ptrace(PTRACE_SETREGS) as shown at 91. The main monitor then resets the PC of Zygote and controls the kernel to continue the Zygote process using signals 93,95, as if nothing had happened.

The newly created child process monitor 72 uses the PID in its memory structure to attach itself to trace the new SKYPE process using ptrace(PTRACE ATTACH) as shown at 92. The process monitor is also configured to replace a main dummy policy decision point of the main monitor with one specific for application process monitors as shown at 94, which will not yet contain any security policies until the application package name (in this case SKYPE) associated with the monitored new process 74 is known. The process monitor is also configured to replace the breakpoint code in the new process 74 with the original code as shown at 96, and initiate execution of the new process via signals 97,98. This is done in a similar manner to the way the main monitor 70 replaced the breakpoint code in the Zygote process 62, as discussed above. The monitored new process 74 can now start executing. As the process monitor 72 is attached to the new process 74, it can intercept and control all the system calls that this process executes.

Configuration of Security Policy for New Process Monitor At this point, there will be the main monitor 70 tracing/monitoring Zygote 62, and a new process monitor 72 tracing/monitoring the newly created LINUX operating system process 74 corresponding to the ANDROID operating system application SKYPE. The new LINUX operating system process 74 hasn't specialized as SKYPE yet, meaning that it is not yet executing the code of the SKYPE application. The specific security policy for the new process monitor 72 cannot be loaded until the new process 74 specialises. The security system is configured to retrieve and load a specific security policy or set of policies to the new process monitor 72 based on application identification data that is indicative of the ANDROID operating system application the new LINUX operating system process 74 is specializing as. In this embodiment, the application identification data is the appication's package name and the process monitor 72 is configured to retrieve this during the specialization of the new process 74 it is monitoring.

To specialize, the new process 74 needs to retrieve the SKYPE application package name so that it can then load the SKYPE application specific code the application database on the device for execution. During the specialization process, the ANDROID operating system framework writes the application's package name into a specialization data file (e.g. /proc/${pid}/cmdline within the /proc pseudo-filesystem). This occurs right after the new process 74 is forked and before the static main method is invoked using reflection.

The ANDROID operating system Process Java class invokes, through the Java Native Interface (JNI), the function android_os_Process_setArgV0 setting the package name as parameter. It will then call the ProcessState::setArgV0( )

method which resets the process argv[0], which effectively changes the specialization data file (i.e. updates it with the application's package name) and then after this sets the process name by using the prctl(PR_SET_NAME) system call. The process name that can be set through the prctl( ) system call is limited to 16 bytes, which means that in some cases, the package name in this system call might not be complete. There are no system calls generated by the monitored process 74 when the argv[0] parameter is set into the specialization data file, which actually contains the whole package name.

In this embodiment, instead of checking the application name specified by the prctl( ) function parameters, the process monitor 72 is configured to read the contents of the specialization data file which contains the full application package name, set when the argv[0] was overwritten. In particular, the process monitor 72 is configured to detect when the prctl( ) system call is exiting.

Once this is detected, this signals to the process monitor 72 that the full application package name has now been written to the specialization data file. The process monitor 72 is configured to then read and retrieve the full application package name from the specialization data file upon detection of the prctl( ) system call exiting.

Once the package name (e.g. com.skype.apk) has been obtained by the process monitor 72, it can then retrieve and load the security policy or policies specific to that application. In particular, the process monitor policies can be initialized and policies can be enforced specific to that process. The package name is forwarded to the process monitor's policy decision point, which will load the specific policies for the monitored process. To do this, the process monitor 74 makes use of a special service in the application layer framework called the security system service, which will be described in further detail later on.

Operation of Monitors

Overview

Each process monitor is configured to enforce the retrieved security policy for its attached new process by implementing a security action at the LINUX operating system layer in regard to the detected system call based on the retrieved security policy. The security action may comprise any one or more of the following: allowing the system call to proceed, blocking the system call from proceeding, or modifying parameters of the system call prior to execution or return values generated by the system call after execution. By way of example, the monitor process may implement a security action by instructing and controlling the kernel in regard to its execution of the requested system call by the attached monitored process. An example implementation of the enforcement of policies is explained below, although it will be appreciated that alternative enforcement mechanisms may be used.

In this embodiment, the main monitor and process monitors each contain two components, namely a policy enforcement point and a policy decision point. The policy enforcement point is in charge of tracing the monitored process through its system calls and enforcing the policies and provides the information from the process state to the policy decision point. The policy decision point generates decisions based on the process state and the policies assigned to it. These decisions are sent to the enforcement point, which makes sure they are enforced.

The policy decision point uses a policies repository, which depends on the security system configuration for each decision point, and that might change on runtime if the configuration is eventually modified. Depending on which type the monitor belongs to (e.g. main monitor or an individual process monitor) it will contain a different type of policy decision point.

The main monitor contains a dummy decision point that is used to intercept the fork( )system call and retrieve the PID of the new process in order to generate new application process monitors, as explained previously.

In contrast, the process monitors are able to retrieve the application package name associated with their respective target process and perform the policy initialization. By way of example, there may be various types of policies supported by the process monitors, such as:

IPC interception: Intercepts Inter-Process Calls generated from the monitored process. In order to do so, it intercepts those ioctl( )system calls which destination is the Binder pseudo-device (/dev/binder).

Networking: Controls internal socket communication through TCP/IP or other network protocols between different processes. This includes control over which external servers, clients or peer to peer networks (for example over the Internet) a process can contact.

Shared memory: block inter-process communication through shared memory.

Specifically block access to the various ANDROID operating system shared memory services ANDROID operating system shared memory (ashmem), Process memory allocator (PMEM and processor specific variants;CMEM, NVMAP, etc.) and the ANDROID operating system ION memory allocator. Furthermore, a child process can be prevented to use shared memory mechanisms with its parent.

File system: Block certain processes to access, create, read, modify and/or write to a specific file or folder in the file system.

Telephony, Short Message Service (SMS) and Multimedia Messaging Service (MMS): block a process to access Telephony, SMS and/or MMS services on the ANDROID operating system. If needed, a policy can be set to prevent that a process initiates Telephone calls or sends SMS or MMS messages to a specific number or contact.

Subscriber Identity Module (SIM) access: block a process from accessing sensitive information from the SIM card installed in the device; such as the Integrated Circuit Card Identifier (ICCID), International Mobile Subscriber Identity (IMSI), Authentication key (Ki), Location Area Identity (LAI), stored SMS messages, Unstructured Supplementary Service Data (USSD) codes and contacts lists.

Sensor and other hardware access: block a process from accessing sensors and other types of input or output hardware that may be present in the device; such as camera sensors, microphones, light sensors, Global Positioning System (GPS) receiver, motion sensors, accelerometers, gyroscopes, keyboards, buttons, displays, projectors, printers.

Near Field Communication: block a process from using Near Field Communication (NFC) or other types of wireless communication to establish a new connection or monitor a communication session that is already in progress.

These policies are loaded with the specific policy configuration associated with application package name in a policy database, stored on the device or remotely accessible. The policies may be modified and updated during the application execution if desired. Some policies, or any other components within the monitors, may need to get access to functionality that is only available from the ANDROID operating system application layer but not from the native code layer, such as access to the GUI or the different ANDROID operating system services like the Package Manager, Activity Manager and so on. The monitors can use such ANDROID operating system Framework functionality through querying the security system service running in the application layer using transactions, as will be explained further later.

Policy Enforcement Mechanism

As discussed, the main monitor 70 and process monitors are processes in the LINUX Operating system layer that are attached to Zygote and any application processes, respectively. A tracing system call is used to attach the main monitor 70 and process monitors to their respective target processes. In this embodiment, the process trace (ptrace) system call is used to attach the main monitor 70 to its target process, namely the Zygote process 62, and each process monitor to its respective target processes. The target processes become the child of their respective monitor or parent process once the ptrace system call is executed.

In regard to the process monitors, the ptrace is configured to trace the target process main thread (by default) and also the rest of process threads and sub-processes, in this embodiment. This is preferred for ANDROID operating system applications, which are always multi-thread applications. By configuring the ptrace to attach to any threads of the main target application process, this ensures that the process monitors receive notifications of any system calls each thread might execute.

The policy enforcement mechanism takes place in the policy enforcement point within each monitor. The policy enforcement point enforces the policies by tracing the monitored process system calls, and making decisions based on the information that can be extracted from them.

In the case of process monitors, the process monitor goes to sleep (e.g. invokes waitpid()) after attaching to the monitored target process. This blocks the process monitor until a system call is invoked from the monitored target process. When a system call is sent by the target process to the kernel, the kernel will stop the monitored target process (e.g. using SIGSTOP signal) and will unblock the process monitor attached to the target process (e.g. using SIGCHILD signal). The function will also return the ID of the thread (TID) that generated the system call as well as some additional process state information that is used for other purposes. At this point the process monitor is configured to retrieve the state of the monitored process registers, from where the system call number can be obtained. The thread ID, system call number and the state of the process registers are forwarded to the policy decision point, that depending on its policies, will consider the system call relevant or not. If it is not relevant, it will return immediately with no decision to the enforcement point. If it is relevant, the policy decision point will analyse the process state and depending on it, it may or may not return a decision to the enforcement point, e.g. a security action to execute. The decision generation mechanism is explained in further detail later. After the decision point returns, the enforcement will continue the monitored process if the decision indicates to do so or implement any other security action indicated by the decision, including blocking the system call, modifying parameters of the system call or return values, requesting user input for implementing user-selected security actions, or even killing the application process altogether. After the decision is enforced, the process monitor goes back to sleep (e.g. invokes waitpid()) waiting for notification of the next system call made by the target monitored process.

Policy Generation Mechanism

Decisions are security actions that have to be executed in order to enforce a set of policies. The policy decision point within each process monitor is the component in charge of the decision generation, which takes place every time the policy enforcement point intercepts a system call. In this embodiment, each policy decision point contains a set of policies, depending on the monitor type and the security system configuration for the monitored application. These policies, also known as low-level policies, in contrast to user-defined policies (those that are specified in the application layer), are defined within the security system itself. A user-defined policy can be translated into one or more low-level policies and can affect one or more monitors depending on its semantics.

The enforcement point triggers the decision generation mechanism. After intercepting a system call, it checks if such call is either entering or exiting, and retrieves the state of the registers for the process that generated it. The policy decision point, as well as policies, have two entry points, one for the entering system calls, and another for the exiting ones. This is due to that the information that can be retrieved at each point is different so different decisions can be made during each stage. Then, the enforcement point forwards to the specific entry point within the decision point the system call number, the state of the process registers, and the TID that generated such system call, (this information being referred herein as the process state). The process state is passed to each one of the policies that may or may not return a decision. In one form, just the first decision returned by a policy is taken into account, and the rest are discarded. In another forms this could be modified by assigning different priorities to each policy. In this embodiment, even if a decision has already been generated by one of the policies, the process state is still passed to the rest of policies, in case they need it to track the process history.

In this embodiment, policies are not monolithic components, they are made instead of reusable modules that can belong to one or more policies know as action modules. Action modules are associated to a unique system call and extract information from the process state, in order to provide information that can be used by the policy to generate a decision. Action modules, the same as the decision point and policies themselves provide two entry points, one for the entering system calls and another one for those that exit, but in contrast to them, they are specific for each thread, so they don't need the thread identifier except at the time they are built. Each policy specifies a list of action modules that is instantiated for each thread and running within the monitored ANDROID operating system application (as well as sub-processes), in such way so that whenever a policy entry point is invoked, if the list of action modules for that thread does not exist, it is created, and it is removed once the thread or process exits.

When the policy entry point is invoked, it will loop over all the actions for the TID that generated the system call that are associated to that specific system call. Should any of these action modules consider the system call invocation is meaningful for it (for instance, ioctl( )on some specific device or open( )on just socket descriptors), the policy will check the data gathered by those action modules and generate a decision (security action). The decision is then returned to the policy decision point, which will decide if should be sent back to the enforcement point or not depending on the other policies results. Finally, if the decision point has returned any decision, the enforcement point will ensure the decision is made in order to enforce the policy that generated it. This process is shown diagrammatically in FIG. 5.

Security System Service

Overview The security system service is an ANDROID operating system service in the application layer that exposes all the ANDROID operating system Framework functionality to the monitors in the LINUX operating system layer. It runs on start-up, before any user application. In contrast to normal ANDROID operating system services that provide services to other ANDROID operating system applications or services, this service does not expose its functionality through intent action filters or an AIDL interface in this embodiment. Instead, the security system service provides its functionality to the process monitors through a communication link or process between the application layer and LINUX operating system layer. In this embodiment, the communication between the security system service in the application layer and the process monitors in the LINUX operating system layer occurs via requests on a TCP port, i.e. the security system service listens for requires on a TCP port. These requests are known as transactions. Each transaction has a unique ID and may contain zero or more parameters that are set by the process monitor and processed in the service, which eventually returns a result back to the process monitor.

Each transaction has a client part, that is the process monitor, and a server part represented by the security system service. The client part sets the transaction identifier (transaction ID) and the parameters and sends them through a socket to the security system service. Transactions are synchronous, so the process monitor gets blocked waiting until the transaction has been processed. The security system service is configured to wait for requests on the security system service socket. Every time a new transaction is received, the security system service retrieves the transaction ID, and builds the server part of the transaction, which loads the parameters from the socket, and is put into a thread pool queue. Once there is an available thread to process the transaction, the transaction runs and performs its functionality. It will return and a result will be sent to the requesting process monitor. To finish the process, the process monitor receives the transaction response and will unblock, continuing its execution. In this embodiment, the communication link may use Transport Layer Security (TLS) for protecting the confidentiality of the communication between the security system service and the process monitors. It will be appreciated that other communication links or mechanisms could be used to enable communication between the security system server and process monitors in other implementations, including, but not limited to, shared memory space or similar.

The security system service, operating in the application layer for accessing the services of the ANDROID operating system framework, allows the specification of per-application policies through the standard ANDROID operating system interface (such as an Application for example). Also, it allows the process monitors to deal with the peculiar way in which the ANDROID operating system implements IPC calls. The security system service provides to the process monitor an entry point to the upper level of ANDROID operating system services and in doing so the process monitor is able to enforce its policies. These aspects are explained further below.

EXAMPLE

Setting a Security Policy

Figure 6:
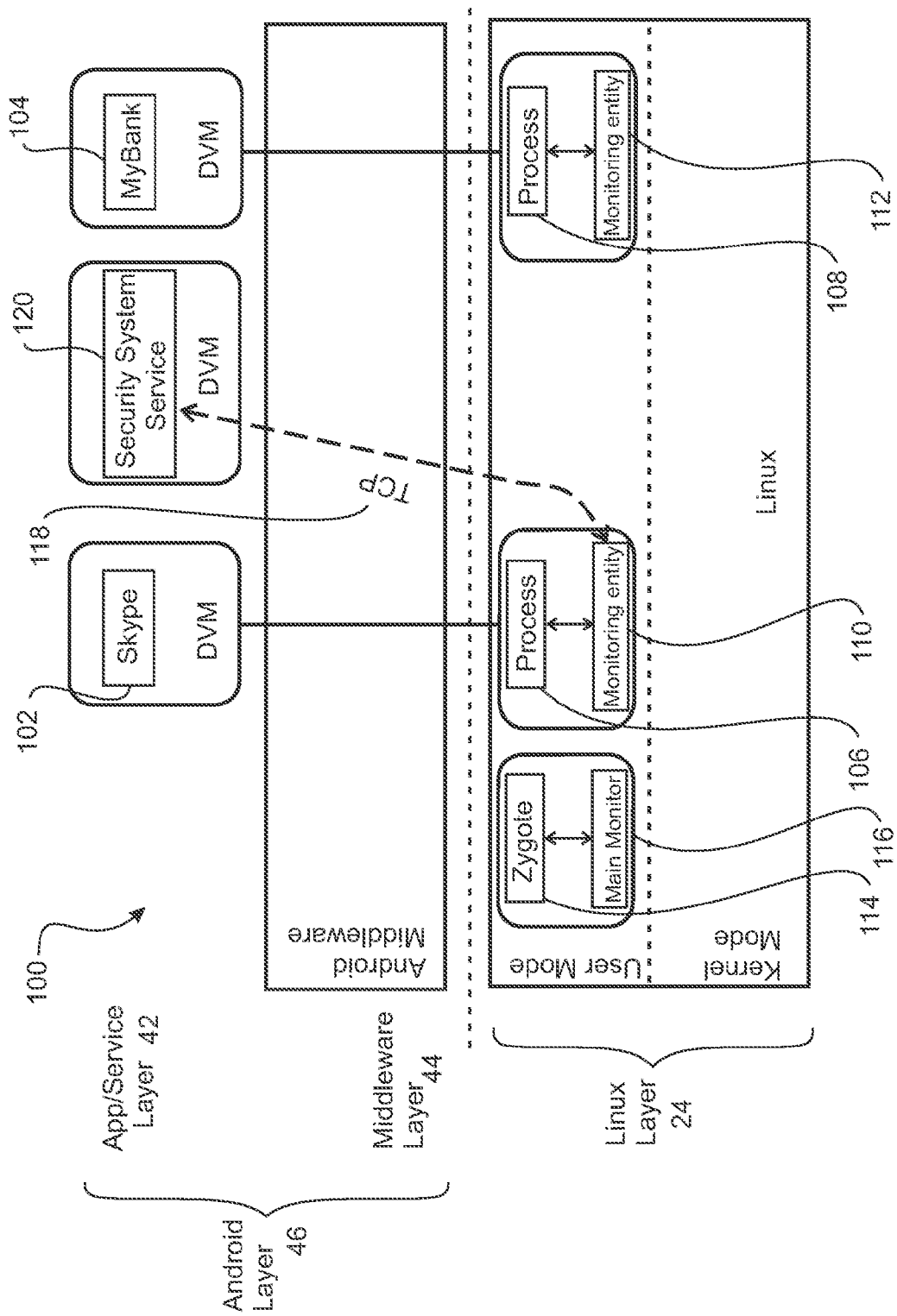
FIG. 6 shows a schematic diagram of the ANDROID operating system architecture and an example configuration of the security system for controlling inter-process communication between applications in accordance with the configured security policies.

Referring to FIG. 6, an example implementation of the security system showing the functionality of the security system service on device 100 running the ANDROID operating system will be described by way of example. The device 100 has a SKYPE application 102 and MyBank application 104 running in the application layer 42, each having or being mapped to a corresponding LINUX operating system process 106, 108 respectively in the LINUX operating system layer 24. Attached to each LINUX Operating system process 106, 108 is a corresponding process monitor 110, 112 respectively. Zygote 114 and its attached main monitor 116 are also shown in the LINUX operating system Layer. The security system service 120 is shown running in the application layer 42 as a normal ANDROID service. By way of example, a TCP communication link is shown between the process monitor 110 associated with the SKYPE application and the security system service 118, and a similar communication link exists or can be established between any other process monitors and the security system service also.

The process monitor 110 attached to the SKYPE application can use the functionality of the security system service 120 for loading policies specific to the SKYPE application. In particular, when the process monitor 110 is configuring itself, it retrieves the application package name associated with the process 106 to which it is attached (as previously explained) and then uses this application identification data to request the security policy or policies for that application from the security system service 120, which has access to the policy database where the policies are stored. The security policies for the applications may be stored in a policy database on the device in memory or alternatively in a remote database on a server or network or other device accessible by the security system service. The security policies may be configured and stored in the policy database in various ways. The policies may be configured via a custom security system application with a GUI that can be launched on the application layer and operated by the user or system administrator, automatically set by virtue of the application permissions during application installation, retrieved from a network or server operated by a third party, or may be configured in any other suitable way.

By way of example, the MyBank application 104 is a sensitive application that the user wants to protect. The user does not trust the SKYPE application 102 to call through IPC the MyBank application. The security administrator can define a high level policy such as: SKYPE not Auth IPC to MyBank. This policy has to be translated in the low level policy that the process monitor 110 can enforce. For instance, for controlling IPC communication between applications, a low level policy may be implemented such as: IPCPolicies that deny an IPC call between the application represented by the "CallingAppPackName" and the application in the "TargetAppPackName". The policy might be: DenyIPCPolicies (CallingAppPackName,TargetAppPackName, Type). This policy takes as argument the package name of the calling application, the package name of the target application and a parameter specifying if the target is either an application or a service. For our case, when the process monitor 110 attached to SKYPE contacts the security system service 120 to request the SKYPE policies when initialising, the security system service will retrieve the relevant policies from the policy database and reply with the parameters specifying the package name for SKYPE, for the MyBank app and that MyBank is an application. The process monitor 110 can then load the IPC policy as follows: DenyIPCPolicies("com.skype.app", "com.mybank.app", APPLICATION).

Monitoring IPC System Calls

In this embodiment, the other main functionality of the security system service is to help process monitors resolve the application name its attached monitored process is trying to communicate with, so that it can then enforce any particular policies in relation to that IPC. In the ANDROID operating system, the IPC call mechanism uses a special type of messages for performing the remote method invocation called 'intents'. An intent represents an abstraction of a method invocation and is the main way in which the Binder manages the IPC between different applications. There are two types of intent supported in the ANDROID operating system: explicit and implicit intents. Explicit intents define which application is the receiver of the intent. The process monitor can directly capture explicit intents and extract the target application (or its package name) from the associated system call being executed by the monitored process. Implicit intents are more problematic for the process monitors to deal with. In an implicit intent, an application can just specify the action that it wants a target application to execute. Then it is up to the ANDROID operating system framework to find the best matching application to reply to the intent. The ANDROID operating system run-time and specifically Activity Manager decides which activity would be the target of the intent.

Activity manager contacts the Package Manager to resolve implicit intents. Package manager is one of the system services which maintain some information about the installed applications and services on the device running the ANDROID operating system.

From the process monitor point of view, when its monitored application is executing an IPC system call using an implicit intent, the process monitor is able to capture the intent and extract its contents, but the extracted information is not enough for evaluating its security policies. An IPC security policy needs as a parameter the target application, but implicit intents only provide the description of the target application. Because the Package Manager is a service running in the application layer on top of the ANDROID operating system middleware layer, the process monitor cannot access it, as the process monitor is running at native code layer or LINUX operating system layer inside the LINUX operating system. However, the process monitor is configured to interact and communicate with the security system service running on the application layer via the TCP port, and can send a request for information indicative of the target application associated with the implicit intent to the security system service, so that it can enforce and relevant security policies in relation to that intent.

For example, with reference to FIG. 6, let's assume that the MyBank application 104 has a method "myPrecious" that is invoked for "getting some precious stuff", and that the SKYPE application 102 wants to send an implicit intent to an application that has the "myPrecious" method with the description "getting some precious stuff". In the ANDROID operating system (without the security system installed), when the SKYPE application 102 sends the intent through the Binder, the Binder will ask the Package Manager which app has the method "myPrecious" method with the description "getting some precious stuff". The Package Manger will reply with the MyBank application 104. Thus the Binder will send the intent to the MyBank application that will reply to the request giving to the SKYPE application 102 the precious stuff, which could lead to security issues. When the security system is installed on the device running the ANDROID operating system, the above process changes as explained below to minimise such security risks.

When the security system is installed on the device running the ANDROID operating system such that a process monitor 110 is attached to the SKYPE application, it will intercept the system call that is generated when the implicit intent is sent from SKYPE application to the Binder. The process monitor 110 is configured to retrieve the information in the intent but initially the policies in the process monitor can't determine the package name of the target application, which is not yet known. The process monitor 110 cannot access the Package Manager in the ANDROID operating system application layer directly, but the security system service 120 can as it is a standard ANDROID service running at the application layer on top of the ANDROID operating system middleware layer with a special communication link for the process monitors, i.e. the TCP connections. When the process monitor 110 intercepts the system call with the implicit intent, it is configured to copy the application description and method, and sends it to the security system service 120 through the TCP link 118 with a request for the package name of the target application. The security system service 120 is configured to receive and processes the request, and asks the Package Manger to provide the package name of the target application that satisfies the description. The Package Manger will return the "com.mybank.app" package name to the security system service that will forward it to the process monitor 110 using the same TCP link 118. Now, the process monitor 110 has the package name information and can evaluate and enforce its security policies. In this, case the policy described above will be evaluated and since it is a deny policy, the action will be denied.

Examples

Various example configurations and/or methods of some embodiments are set out below.

A first example is a method for securing an operating system running on a device comprising a LINUX-based kernel and a system architecture defined by a middleware layer between the LINUX operating system layer associated with the kernel and the higher application layer comprising applications. The method comprises monitoring system calls to the kernel mode by a mother process in the LINUX operating system layer to detect the launching of a new process in the LINUX operating system layer corresponding to a new application or part of an application in the application layer, and attaching a new monitor process in the LINUX operating system layer to the newly launched process once it is created by the mother process. The monitor process is configured to monitor system calls made to the kernel by the new process and to retrieve and enforce security policies configured for the new process based on the parameters of detected system calls.

A second example is a security system for an operating system running on a device that comprises a LINUX-based kernel. The system architecture is defined by a middleware layer between the LINUX operating system layer associated with the kernel and the higher application layer comprising applications. The system comprises a main monitor process running at the LINUX operating system layer which is configured to detect the launch of a new process in the LINUX operating system layer by a mother process, the new process corresponding to the launching of a new application or part of an application in the application layer by the user of the device. A process monitor is attached by the main monitor to each new process created by the mother process and each process monitor is configured to monitor the system calls made by its attached process to the kernel. A security system service running at the application layer is provided that is operable to access stored configurable security policies for the applications of the application layer, and which communicates with each process monitor in the LINUX operating system layer the security policies corresponding to its attached process. Each process monitor is configured to retrieve and enforce the security policy configured for its attached process based on the parameters of the detected system calls.

A third example is a method of configuring a process monitor attached to a new target process in a security system for an operating system running on a device that comprises a LINUX-based kernel. The system architecture is defined by a middleware layer between the LINUX operating system layer associated with the kernel and the higher application layer comprising applications. The method comprises monitoring the specialization process of the target process as it specializes as its intended application, extracting application identification data from the specialization process that is indicative of the application or type of application the target process is specializing as, retrieving security policies specific to the target process from a policy database based on the extracted application identification data, and configuring the process monitor to enforce the retrieved security policies.

A fourth example is a method of linking a security policy stored in a policy database and which is specific to an application in the application layer with a new corresponding process launched in the LINUX operating system layer in a security system for an operating system running on a device that comprises a LINUX-based kernel. The system architecture is defined by a middleware layer between the LINUX operating system layer associated with the kernel and the higher application layer comprising the applications. The method comprises monitoring the specialization process in the LINUX operating system layer of the new process as it specializes as its intended application, extracting application identification data from the specialization process that is indicative of the application or type of application the target process is specializing as, and creating a link between the new process and a security policy from the policy database based on the application identification data.

A fifth example is a method of implementing security policies at the LINUX operating system layer, the policies being defined for applications or types of applications in the application layer. The method comprises monitoring the loading and/or identification of code used to specialize a new LINUX operating system process to implement its corresponding intended application, and linking a security policy for implementing at the LINUX operating system layer to the new LINUX operating system process based on the loaded or identified code.

General

Embodiments of the security system may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In the foregoing, a storage medium may represent one or more devices for storing data, including read-only memory (ROM), random access memory (RAM), magnetic disk storage mediums, optical storage mediums, flash memory devices and/or other machine readable mediums for storing information. The terms "machine readable medium" and "computer readable medium" include, but are not limited to portable or fixed storage devices, optical storage devices, and/or various other mediums capable of storing, containing or carrying instruction(s) and/or data.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, circuit, and/or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD- ROM, or any other form of storage medium known in the art. A storage medium may be coupled to the processor such that the processor can read information from, and write information to, the storage medium. In the alternative, the storage medium may be integral to the processor.

One or more of the components and functions illustrated the figures may be rearranged and/or combined into a single component or embodied in several components without departing from the invention. Additional elements or components may also be added without departing from the invention. Additionally, the features described herein may be implemented in software, hardware, or combination thereof.

In its various aspects, the invention can be embodied in a computer-implemented process, a machine (such as an electronic device, or a general purpose computer or other device that provides a platform on which computer programs can be executed), processes performed by these machines, or an article of manufacture. Such articles can include a computer program product or digital information product in which a computer readable storage medium containing computer program instructions or computer readable data stored thereon, and processes and machines that create and use these articles of manufacture.

The foregoing description of the invention includes preferred forms thereof. Modifications may be made thereto without departing from the scope of the invention as defined by the accompanying claims.

The invention claimed is:

1. A method of linking a security policy stored in a policy database and which is specific to an application in an application layer with a corresponding new process launched in a user mode of a lower layer in a security system for an operating system running on a device, an architecture of the operating system comprising a kernel operable in a kernel mode of the lower layer and a middleware layer between the lower layer associated with the kernel and the higher application layer comprising the applications, the method comprising:

monitoring a specialization process, executed in the user mode of the lower layer by the operating system, of the corresponding new process as it specializes as its intended application, the specialization process executed by the operating system comprising identifying the application in the application layer to which the new process corresponds and loading the application-specific code for that application into the process for execution;

extracting application identification data from the specialization process that is indicative of the application or type of application the new process is specializing as; and creating a link between the new process and a security policy from the policy database based on the application identification data.

2. A method according to claim 1 wherein creating a link comprises retrieving the security policy from the policy database and loading it into a process monitor attached to the new process for enforcing the security policy.

3. A method of implementing security policies in an operating system architecture comprising a lower layer comprising a kernel that is operable in a kernel mode and a user mode within which processes execute corresponding to applications in a higher layer, the security policies being defined for applications or types of applications in the higher application layer, wherein the method comprises monitoring a specialization process, executed in the user mode of the lower layer by the operating system, comprising the loading and/or identification of code used to specialize a new process launched in the user mode of the lower layer to implement its corresponding intended application, and linking a security policy for implementing in the user mode of the lower layer to the new process based on the loaded or identified code.

4. A method according to claim 3 wherein the security policies are defined for each application or a type of application.

5. A method according to claim 3 wherein linking a security policy to the new process comprises identifying a security policy for the new process from the code used to specialize the new process.

6. A method of configuring a process monitor attached to a new target process in a security system for an operating system running on a device, an architecture of the operating system comprising a kernel operable in a kernel mode of a lower layer, and a middleware layer between the lower layer associated with the kernel and a higher application layer comprising applications, the method comprising:

monitoring a specialization process, executed in a user mode of the lower layer by the operating system, of the target process launched in the user mode of the lower layer as it specializes as its intended application, the specialization process executed by the operating system comprising identifying the corresponding application in the application layer to which the target process relates and loading application-specific code the corresponding application for execution;

extracting application identification data from the specialization process that is indicative of the application or type of application the target process is specializing as;

retrieving security policies specific to the target process from a policy database based on the extracted application identification data; and configuring the process monitor to enforce the retrieved security policies.

7. A method for securing an operating system running on a device, an architecture of the operating system comprising a kernel operable in a kernel mode of a lower layer, and a middleware layer between the lower layer associated with the kernel and a higher application layer comprising applications, the method comprising:

monitoring system calls to the kernel mode by a mother process in the lower layer to detect the launching of a new process in a user mode of the lower layer corresponding to a new application or part of an application in the application layer; and attaching a new monitor process in the user mode of the lower layer to the newly launched process in the user mode of the lower layer once it is created by the mother process, the monitor process being configured to monitor system calls made to the kernel by the new process and to retrieve and enforce security policies configured for the new process based on the parameters of detected system calls.

8. A method according to claim 7 further comprising providing security policies for the applications in the application layer in a policy database.

9. A method according to claim 7 wherein attaching a monitor process to the new process in the lower layer comprises configuring the monitor process as a master process and the associated new process as its target process.

10. A method according to claim 9 wherein attaching the monitor process to the new process comprises requesting the kernel to execute a tracing system call that is configured to intercept all or at least a set of system calls executed by the target process and report those to the master process prior to execution of the system call.

11. A method according to claim 10 wherein the tracing system call is a process trace system call (ptrace).

12. A method according to claim 10 wherein the kernel is configured to report to the master process system calls made by the target process both prior to and after the execution of the system call.

13. A method according to claim 8 wherein the monitor process is configured to access and retrieve the security policy for its attached new process from a security system service at the application layer which has access to the configurable security policies for the applications of the application layer in the policy database.

14. A method according to claim 13 wherein the monitor process at the lower layer is configured to establish a communication link with the security system service at the application layer.

15. A method according to claim 9 wherein the method further comprises loading the new monitor process with the relevant security policies for its attached target process by:

monitoring a specialization process, executed in the user mode of the lower layer by the operating system, of the target process as it specializes as its intended application, the specialization process executed by the operating system comprising identifying the corresponding application in the application layer to which the target process relates and loading the application-specific code for that application for execution;

extracting application identification data from the specialization process that is indicative of the application the target process is specializing as; and retrieving the relevant security policies for the target process based on the extracted application identification data.

16. A method according to claim 15 wherein the application identification data may be the application package name.

17. A method according to claim 15 wherein the method comprises extracting the application identification data from a system call in the specialization process.

18. A method according to claim 15 wherein the method comprises extracting the application identification data from a specialization data file that the full application package name of the target process is written to during the specialization process.

19. A security system for an operating system running on a device, the operating system architecture comprising a lower layer comprising a kernel operable in a kernel mode and a user mode within which processes execute corresponding to an application in a higher application layer, and a middleware layer between the lower layer associated with the kernel and the higher application layer comprising applications, the system comprising:
 a main monitor process running in the user mode of the lower layer which is configured to detect the launch of a new process in the user mode of the lower layer by a mother process, the new process corresponding to the launching of a new application or part of an application in the application layer by the user of the device;
 a process monitor attached by the main monitor to each new process created by the mother process and each process monitor also executing in the user mode of the lower layer and being configured to monitor the system calls made by its attached process to the kernel; and
 a security system service running at the application layer that is operable to access stored configurable security policies for the applications of the application layer, and which communicates with each process monitor in the lower layer the security policies corresponding to its attached process, and wherein each process monitor is configured to retrieve and enforce the security policy configured for its attached process based on the parameters of the detected system calls.

20. A security system according to claim 19 further comprising an accessible policy database comprising stored configurable security policies for the applications in the application layer.

21. A security system according to claim 20 wherein the policy database is stored on the device or remotely stored and accessible by the device.

22. A security system according to claim 19 wherein the main monitor process is attached to the mother process.

23. A security system according to claim 22 wherein the main monitor process is attached to the mother process by a process trace system call, with the main monitor configured as the master process and the mother process being configured as the target process.

24. A security system according to claim 19 wherein each process monitor is attached to its respective process by a process trace system call, with the process monitor being the master process and its respective attached process being the target process.

25. A security system according to claim 19 wherein each process monitor is configured to load the security policies for its attached target process by retrieving the security policies from the security system service.

26. A security system according to claim 25 wherein each process monitor is configured to monitor a specialization process, executed in the user mode of the lower layer by the operating system, of its target process to extract application identification data indicative of the application the target process is specializing as, and to retrieve the relevant security policies for the target process from the security system service based on the extracted application identification data.

27. A security system according to claim 19 wherein each process monitor is configured to communicate with the security system service over a communication mechanism between the lower layer and the higher application layer.

28. A security system according to claim 27 wherein the communication mechanism comprises client-server transactions over a transmission control protocol (TCP) link.

\* \* \* \* \*